United States Patent [19]

Moosberg

[11] Patent Number: 4,601,439

[45] Date of Patent: Jul. 22, 1986

[54] MAGNETIC BRAKE FOR A FISHING REEL

[75] Inventor: Börje S. Moosberg, Mörrum, Sweden

[73] Assignee: ABU Aktiebolag, Svangsta, Sweden

[21] Appl. No.: 741,165

[22] Filed: Jun. 4, 1985

[30] Foreign Application Priority Data

Jun. 5, 1984 [SE] Sweden .................................. 8403016

[51] Int. Cl.$^4$ .............................................. A01K 89/02
[52] U.S. Cl. .............................. 242/84.52 B; 310/93; 310/105
[58] Field of Search ........................ 242/84.52 B, 45; 310/93, 105

[56] References Cited

U.S. PATENT DOCUMENTS

| | | | |
|---|---|---|---|
| 2,361,239 | 10/1944 | Ransom | 242/84.52 B |
| 2,550,861 | 5/1951 | Ransom | 242/84.52 B |
| 3,090,571 | 5/1963 | Lohest et al. | 242/45 |
| 4,013,241 | 3/1977 | Gray | 242/84.52 B |

FOREIGN PATENT DOCUMENTS 58-137074  9/1983  Japan ........................... 242/84.52 B Primary Examiner—Billy S. Taylor
Attorney, Agent, or Firm—Sheridan Neimark; A. Fred Starobin

[57] ABSTRACT

A magnetic brake for braking the line spool of a fishing reel with magnetic braking automatically adjusted in dependence upon the speed of rotation of the line spool. A magnetic support for magnets is rotatable in one direction by the reactive force of the braking torque on the magnet support and in the opposite direction by an adjustable spring load. The reactive force of the braking torque tends to displace the magnet support in a direction to move the magnet poles away from a surface rotating together with the line spool, while the spring load tends to displace the magnet support in the opposite direction to decrease the distance between pole ends and the rotating surface moving with the line spool. Inclined camming grooves in one embodiment move along a guide pin to cause the rotating action of the magnet support to move the support in an axial direction. Another embodiment uses a sector support with magnets radially extending from the support and moving toward and away from a flanged surface while mounted on an eccentrically mounted sector.

3 Claims, 4 Drawing Figures

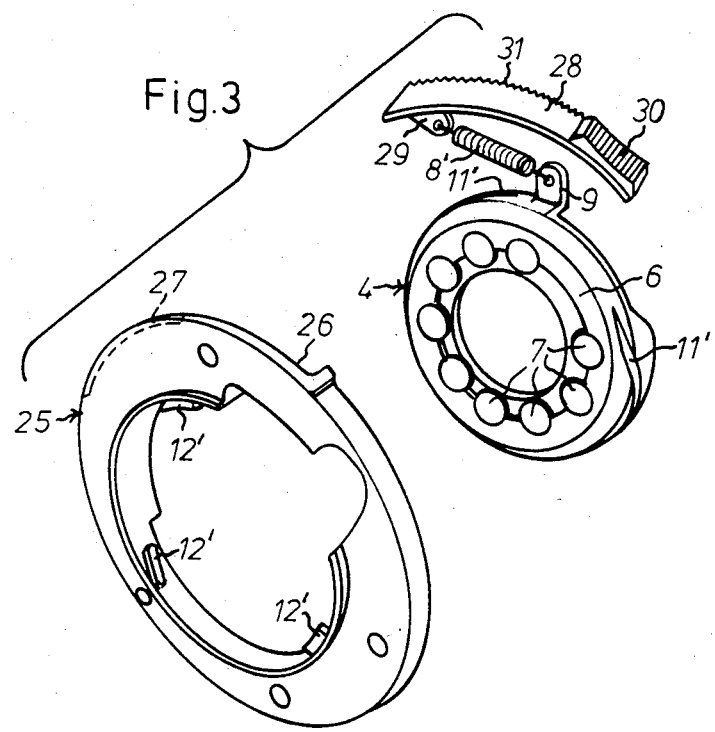
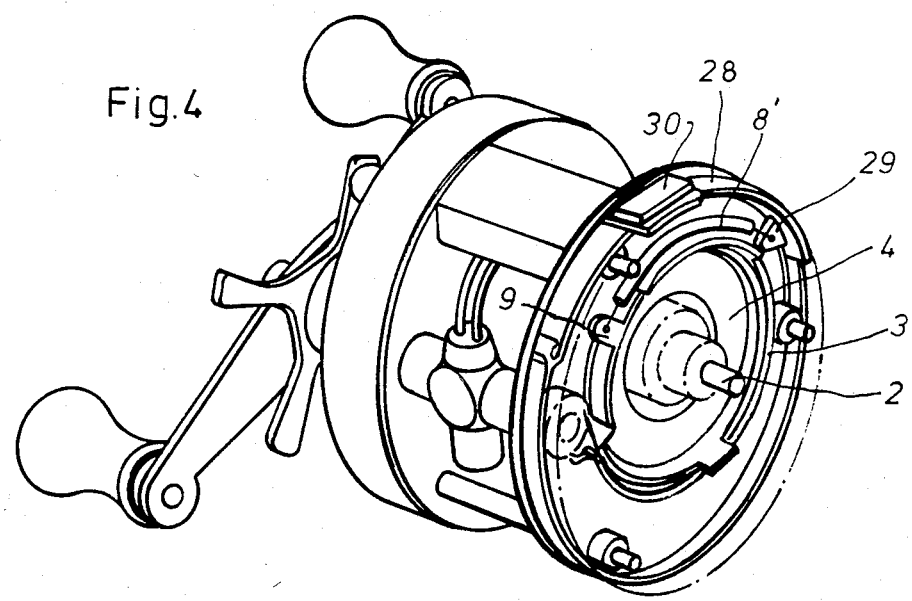

MAGNETIC BRAKE FOR A FISHING REEL

The present invention relates to a magnetic brake for inductive braking of the line spool of a fishing reel.

Magnetic brakes of this type are used for braking the line spool during casting so as to prevent the line spool from rotating at a higher speed than the reeling-out speed of the line, which generally results in backlash and overrunning of the spool with consequent tangling of the line.

Examples of the state of the art are disclosed in the SE patent specification No. 8203630-2 and GB patent application No. 2,092,872.

In prior art magnetic brakes of this type, the effect of the magnetic brake can be manually adjusted by means of an adjusting device, but for each selected setting of the magnetic brake, this acts in such a manner that the braking force is largest at the beginning of a cast when the speed of rotation of the line spool is highest and thereafter decreases rapidly with the decrease of the speed of rotation. At the final stage of the cast or even before, the braking force has decreased to a low value and, at the moment the bait attached to the fishing line reaches the surface of the water and the line pull-out force produced by the bait at the end of the line ceases, it has reached an almost negligible value. Thus, also during the final stage of the cast, it may happen that the line spool rotates at a speed higher than the reeling-out speed of the line.

The object of the invention is to provide a magnetic brake whose braking effect is automatically adjusted by the speed of rotation of the line spool.

According to the invention, this object has now been achieved in a fishing reel comprising a frame, a line spool rotatably mounted in the frame, a magnetic brake including a plurality of permanent magnets, magnet supporting means movably mounted in said frame and supporting said magnets, and a rotary surface consisting of magnetically activable material and connected to be rotated by said line spool when the latter is rotated, said magnets having pole ends facing said surface in such spaced relationship thereto that the magnetic field therebetween is capable of inducing eddy current therein when said line spool with said surface is rotated, thereby to effect a braking torque on the rotating line spool via said surface, the force of said braking torque being related to the strength of said magnetic field and to the distance between said pole ends and said surface, said supporting means being movable in relation to said surface between first and second end positions, said pole ends in said first and second end positions of said supporting means being positioned, respectively, at a predetermined minimum and a predetermined maximum distance from said surface, and said magnetic brake further comprising guide means for allowing said magnet supporting means to be moved between said end positions in combination with rotational movements only, and spring biasing means connected to said magnet supporting means and tending to rotate and thereby to move said magnetic supporting means in one direction to one of said first and second positions, the counter-electromotive force induced in said surface when the latter, together with the line spool, is rotated tending to rotate and thereby to move said magnet supporting means in the opposite direction against the action of said biasing means, whereby the actual position of said magnet supporting means between said first and second end positions and, hence, the braking effect of said magnetic brake on said line spool are automatically adjusted in dependence upon the speed of rotation of the line spool.

The invention will be described in more detail hereinbelow in some embodiments with reference to the accompanying drawings, in which:

FIG. 1, with a view to illustrating the principle of the invention for automatically adjusting the braking effect, in a schematic perspective view illustrates a magnetic brake according to the invention which cooperates with a schematically and only partly illustrated line spool;

FIG. 3 is a perspective view of two mutually separated parts of a magnetic brake in a practical embodiment according to the invention; and FIG. 4 is a perspective view of a fishing reel equipped with a magnetic brake according to the invention.

Figure 1:
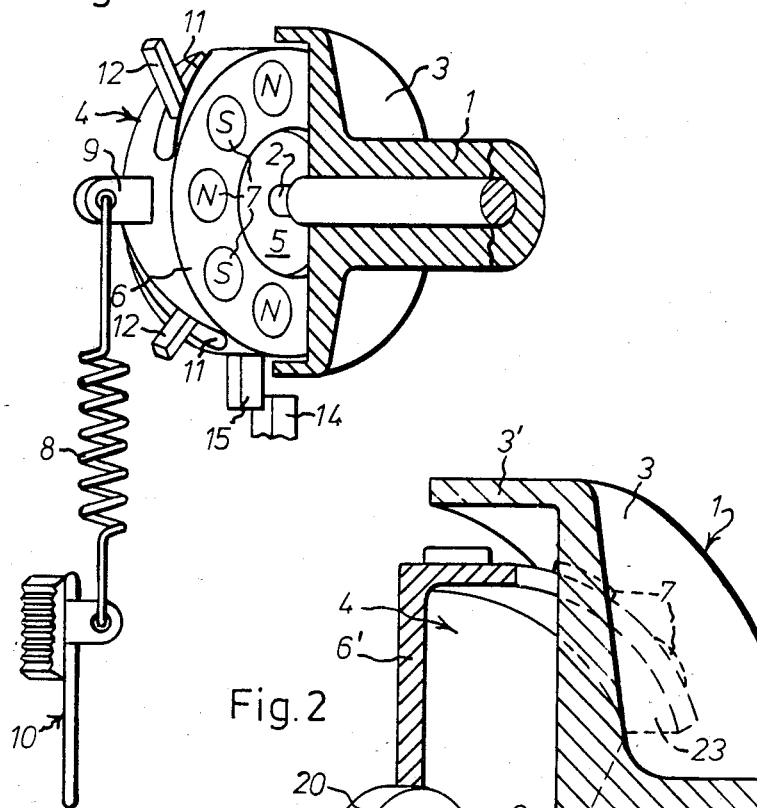

In FIG. 1, there is shown a line spool 1 which is rotatably mounted on or together with a shaft 2. These parts are the only components of a known fishing reel of the so-called multiplying type that are illustrated in this Figure, but it may be mentioned that the line spool 1, if rotatably mounted on the shaft 2, is adapted to be driven by the handle of the fishing reel via a transmission and a clutch which is disengageable for disengaging the line spool such that it can rotate freely. If the line spool is instead fixedly connected in rotational respect to the shaft 2, the shaft is rotatably mounted and adapted similarly to be driven by the transmission and the handle and be disengaged therefrom.

The line spool has an end wall 3 which in a per se known manner, although modified according to the invention, cooperates with a magnetic brake generally designated 4 which is mounted with a certain mobility, as will be described in more detail hereinbelow, in the fishing reel axially on one side of the line spool and coaxially in relation to the line spool 1 and the shaft 2. In the illustrated embodiment, the shaft 2 extends through an opening 5 in a frame 6 associated with the magnetic brake and carrying a number of magnets. In the embodiment of FIG. 1, the frame 6 of the magnetic brake forms a cylindrical magnet support holding a circular row of small, preferably cylindrical magnets placed in pockets in the magnet support. The circular row of magnets is coaxial with the line spool shaft 2 to which the longitudinal axes of the magnets are parallel. Of the pole ends 7 facing the end wall 3 of the line spool, every other is a north pole and every other a south pole. During rotation of the line spool, a counter-electromotive field due to eddy currents generated in the circular wall 3 tends to act as a braking torque against rotation of the line spool in a per se known manner. The distance between the pole ends 7 of the magnets and the wall 3 of the line spool is variable by axial displacement of the magnet support 6, whereby the braking power can be adjusted.

It is customary that such adjustment is carried out manually by means of a control knob accessible from the external side of the fishing reel, for instance as disclosed in the above-mentioned SE patent specification No. 8203630-2.

According to the invention, however, the adjustment of the axial setting of the magnet support is automatically effected in dependence upon the speed of rotation of the line spool.

The magnet support is mounted for rotational movement back and forth through a certain angle about the axis of rotation of the line spool and, as earlier mentioned, is also axially displaceable within certain limits. The magnets bring about a braking effect by producing the field of eddy currents in the wall 3 of the line spool. Naturally, this braking effect exerts a torque on the magnet support and if the magnet support had been rotatable without any friction, the magnet support would participate in the rotation of the line spool with a certain drag depending upon inertia.

According to the invention, this fact is used for producing, by the torque on the magnet support during rotation of the spool, axial displacement of the magnet support in a direction towards or away from the line spool. To counterbalance the torque produced by the field on the magnet support and to axially return the magnet support in a direction towards or away from the line spool, the magnet support is connected to a spring load of a suitable type. In the embodiment shown in FIG. 1, the spring load simply consists of a helical spring 8 hooked to one end of a lever 9 of the magnet support 6. The spring is adapted to be stretched by a tractive force exerted at the other end by an adjusting device 10.

Further, the magnet support 6, in its outer circumferential surface, has a number of cam grooves 11, preferably three, which are curved, for instance helical with a suitable pitch, e.g. about 15°, in relation to the axis of the spool or magnet support. A guide pin 12, stationary with respect to the frame (not shown) of the fishing reel, engages in each such cam groove 11.

This arrangement forces the magnet support to execute an axial movement when it is rotated on account of the indicated torque upon rotation of the line spool. By this action, the magnet support is displaced at a high speed of rotation of the line spool in one direction to an axial end position against the action of the spring load and when the speed of rotation of the line spool successively decreases, the magnet support is successively rotated by the spring load in the opposite direction and in accordance with the decrease of the braking torque. The magnitude of the freedom of movement of the magnet support for rotation and axial displacement can be limited by selecting the length and pitch of the cam grooves 11, but preferably and as shown in FIG. 1, the rotational movement is restricted and, hence, the axial movement in the direction of the line spool by a stop 14 connected to the frame of the fishing reel, and an abutment 15 in the form of a projection on the magnet support, such that this will be prevented, upon axial movement, from contacting any rotary part, especially the end wall 3 of the line spool.

Since the stop 14 and the abutment 15, which may be relatively sturdy, arrest the magnet support in an inner end position, the guide pins 12 will be protected against deforming or surface-damaging abutment forces against the cam groove ends which, in principle, may be used as abutments cooperating with the pins 12.

When, at the beginning of a cast, the line spool 1 is rotated at a high speed, said field exerts a maximum torque on the magnet support, if the influence of the axial distance between the pole ends of the magnets and the wall 3 is disregarded, which cannot however be done. Assuming that the magnet support at the beginning of a cast is at a maximum distance from the wall 3 of the line spool, the magnet support is displaced in a direction towards the line spool by being rotated by the indicated torque, and the closer the line spool comes to the wall 3, the more powerful becomes the power of the torque since the magnetic field increases with the reduction of said distance. Under these circumstances, the magnet support will be rapidly displaced in a direction towards the line spool to its inner end position by the very rapid rotation at the beginning of a cast. The braking effect on the line spool is greatest at the initial phase of the cast when the speed of rotation of the line spool is highest, and as the speed of rotation decreases, the spring load causes the magnet support to be moved in a direction away from the line spool, whereby the braking torque is reduced.

Such a mode of operation bears a certain resemblance to the mode of operation in a manually adjustable magnetic brake. Also in such a brake, the braking torque is very powerful at the beginning of a cast and successively decreases with a decreasing speed of rotation. The difference is that in the latter case, i.e. in a manually adjustable magnetic brake, the axial distance between the magnet poles and the line spool is constant during the cast and the braking torque will not decrease as rapidly as in the former case.

Thus, in both these cases the braking power decreases in a certain proportion to the speed of rotation of the line spool and attains low values at the final stage of the cast.

It is however desirable to maintain the braking effect of the magnetic brake on the line spool during a longer phase of the cast, preferably until the bait fixed to the line reaches the surface of the water, so as to allow the angler to effect a cast without having to brake the line spool with his fingers during the final stage of the cast.

According to the invention, this is achieved in that the magnet support 6 is urged towards a rear position which is at a greater distance from the line spool than at the beginning of a cast, in order thereafter to successively approach the line spool as the speed of rotation decreases. In this manner, it is achieved that the braking effect on the line spool at the beginning of a cast decreases very rapidly in that the magnet support is quickly moved in a direction away from the line spool, whereupon the distance up to the line spool successively decreases and the braking power is maintained on the desired level.

This can be achieved by selecting the direction of the pitch of the cam grooves 11 such that the torque acting on the magnet support by the rotation of the line spool forces the magnet support to move in a direction away from the line spool against the action of the spring bias which, as soon as it overcomes the torque produced by said field, will rotate the magnet support in the opposite direction so as to return the magnet support in a direction towards the line spool.

By suitably designing the cam curve for converting the rotational movement into an axial movement, it is possible to obtain a braking torque which compensates for the decrease of the speed of the line spool during casting.

Figure 2:
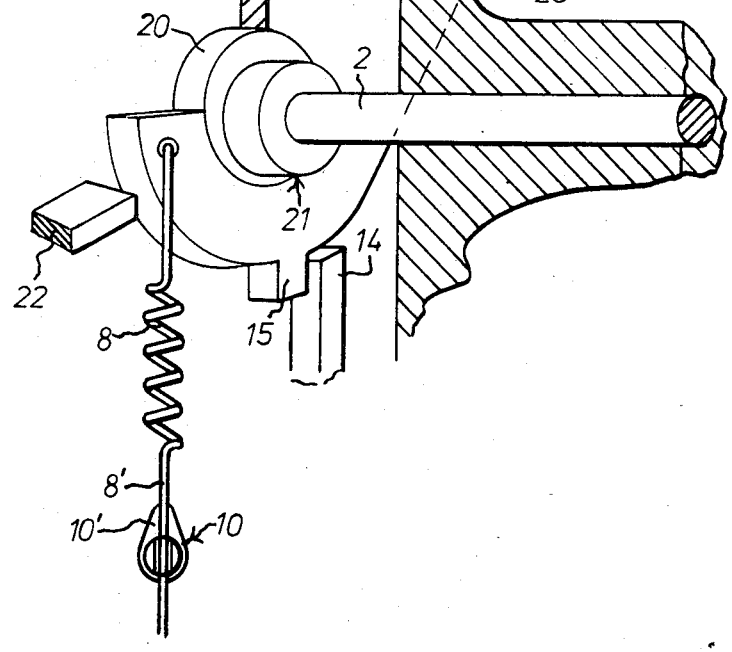
FIG. 2 is an equally schematic and fragmentary perspective view of a modified embodiment.

From FIG. 2, to which reference is now made, it appears however that axial movement of the magnet support is not necessary for achieving the object of the invention.

The embodiment illustrated in FIG. 2 differs from that of FIG. 1 substantially in that the movement of rotation of the magnet support 6', as produced by said field, automatically adjusts the braking effect by bringing about a radial change of the distance of the magnets 7 in relation to an axial rotary surface which in FIG. 2 is represented by an axial flange 3' of one end wall 3 of the line spool 1.

To this end, the magnet support in FIG. 2 is mounted on a circular circumferential surface 20 of an eccentric 21 which is supported on the shaft 2, here fixed, of the line spool but which, as alternatively, may be supported on any other fixed part of the fishing reel, such that the circular circumferential surface 20 of the eccentric is eccentric in relation to the axis of rotation of the line spool. The magnet support 6' is retained in its resting position by the spring 8 and in an angular position by means of a pair of abutment members 14, 15 of the same type as in FIG. 1. The torque on the magnet support inductively generated on rotation of the line spool tends to rotate the magnet support against the action of the tension spring 8. The end position of such a movement of rotation is determined by an abutment 22 which is fixed or adjustable from outside. When the speed of rotation of the spool is high, as at the beginning of a cast, the magnet support is rapidly rotated in a direction towards the end position defined by the abutment member 22, the magnets 7, in this case disposed on a sector-shaped radially outer part 23 of the magnet support, being moved in a direction radially inwardly from the flange 3', as at the same time the sector 23 is moved a certain distance in the circumferential direction. As a result the average distance of the set of magnets from the flange 3' is decreased and the pretensioned spring 8 is further tensioned. When the speed of rotation of the line spool decreases, the spring is capable of returning the magnet support, the magnets being moved radially closer to the flange 3'. As in the embodiment in FIG. 1, this means an automatic adjustment of the effect of the magnetic brake on the line spool without the need of any axial displacement of the magnet support. As in the embodiment in FIG. 1, the spring bias can be adjusted by means of a suitable adjusting device which is accessible from the outer side of the fishing reel and which is shown at 10 as a lever or an eccentric 10' acting on the straight end portion 8' of the spring 8.

The principle of movement of the magnet support as shown in FIG. 1 is also applicable to the radial setting of the distance between the magnets of the of the magnet support and a rotary axial surface. If the magnets are placed with vertical axes on a cylindrical circumferential part of the magnet support in FIG. 1, inwardly of a conical flange, as opposed to the axial flange in FIG. 2, the average distance between the pole ends and the conical flange is actually changed upon axial displacement of the magnet support. The same applies if the magnets are placed on a conical part of the magnet support for cooperation with an axial flange of the type shown in FIG. 2. These and other variants of the embodiments in FIGS. 1 and 2 are conceivable. For instance, use may be made of an internally threaded hub supported by the magnet support and cooperating with an external thread of a fixed part for producing axial displacement of the magnet support upon rotation thereof.

FIG. 3 shows the main components of a practical embodiment according to the principle of a magnetic brake 4 according to the inventions illustrated in FIG. 1. As in FIG. 1, the magnet support and the magnets are designated 6 and 7, respectively. The device for transforming a rotary movement into an axial movement of the magnet support 6 with the magnets 7 here comprises a guide ring 25 which is intended to be connected to the frame of the fishing reel, between the frame and a cover serving as external end wall. Since no parts of the fishing reel itself are shown in FIG. 3, said frame and cover are not visible. The mode of operation agrees with that described with reference to FIG. 1, i.e. the magnet support 6 is displaced axially in a direction towards and away from one end wall of the line spool by being rotated back and forth within a fraction of a revolution, for instance 10°–15° depending on the pitch of the guide curve.

The magnet support 6, which is annular, is dimensioned and designed for mounting in the central opening of the guide ring 25 with the pole ends 7 facing one end wall of the line spool and spaced a small distance therefrom. The magnet support 6 and the guide ring 25 are so arranged in relation to each other that the magnet support when mounted in place in the guide ring 25 is rotatable and at the same time axially displaceable relative to the guide ring connected to the frame of the fishing reel, within predetermined limits for the angular and axial movements. Apart from this mobility, the guide ring 25 constitutes an external holder which supports and retains the magnet support 6 in place.

According to a preferred embodiment, the magnet support 6 has, along its relatively narrow outer circumferential surface, a number of guide or cam grooves 11', preferably three, which are designed with a certain pitch angle in the outer circumferential surface of the magnet support in the area between the opposite end surfaces thereof. The pitch may range for instance from about 15° to 20° and need not necessarily be equally large or small throughout the entire length of the guide groove but may vary according to a curve in dependence upon the special characteristic it is desirable to give the axial movement and, hence, the adjustment of the braking torque in dependence upon the speed of rotation of the line spool and the rotational movement of the magnet support 6 depending thereupon. Inclined, thread fragment-like guide tongues 12' which are supported by the guide ring and extend radially inwardly from the inner circumferential surface of said ring engage in the guide grooves and force the magnet support to move axially when being rotated. The ends of the cam grooves 11' may be arranged, in cooperation with the tongues, to form stops but, alternatively or preferably, the magnet support has an axial projection which is arranged to cooperate with one or two spaced apart abutments (not shown) which are connected to the ring or to said outer cover and, hence, are connected to the frame of the fishing reel. Both or either of these abutments may be adjustable from the outer side of the fishing reel for maximizing and/or minimizing the movement or stroke of the magnet support. Also in other respects, the device operates according to the principle described with reference to FIG. 1 and, thus, also comprises an adjustable spring 8' exerting a torque on the magnet support for returning it in a direction towards an axial starting position from which the magnet support is displaced in the above-described manner by the quick rotational movement of the line spool at the beginning of a cast.

In the illustrated embodiment, the spring 8' is a slender helical spring acting between a lever 9 on the magnet support and a circularly curved adjusting slide 28 adapted to adjust the spring bias and movable along a circumferential guide surface 26 followed by a guide groove 27 of the guide ring 25. Also, it may be mentioned that the guide surface 26 and the guide groove 27 merely have about half width for the spring-adjusting slide 28 and that the above-mentioned cover (not shown) has a corresponding guide groove and guide surface which are partly complementary to the guide groove 27 and guide surface 26 of the magnet ring to the entire width of the slide when the guide ring is mounted in the above-described manner between the cover and the frame of the fishing reel, but through a short distance along the region of the surface 26 the guide ring and the cover leave a small gap through which the spring attachment 29 on the slide extends in between said parts (ring and cover). The spring-adjusting slide has a handle 30 which is accessible from outside for changing the bias of the spring, which may be a tension spring 8, by moving the slide back and forth in the circumferential direction of the guide ring within the length of the guide surface 26. In the position of use, the spring extends along a substantially circular arc about the outer circumference of the magnet support 6. Each intentionally adjusted angular position of the slide is maintained unaltered, for instance by means of a spring lock, such as a spring wire (not shown) connected to the cover and acting against a fluted edge surface 31 of the slide.

It should however be observed that the arrangements for the spring bias and for the conversion of rotational movement of the magnet support into axial movement where applicable or quite generally for moving the pole ends of the magnets closer to and away from a rotary surface adjacent said pole ends, may vary according to the design, as selected in each particular case, of the other constructional details of the magnetic brake according to the invention. The opposite forces acting on the magnet support by means of the spring 8 and as a result of the induced reactive force which acts as braking torque on the line spool are allowed to balance each other by the mobility of the magnet support which tends to maintain the balance by changing positions. In one case of theoretical interest, which might be used for special purposes, the positional change of the magnet support may be such that the braking effect attains a maximum at the beginning of a cast and thereafter decreases rapidly. However, in the preferred instance, the magnet support moves in a direction to maintain the braking torque on the line spool despite a decreasing speed of rotation during casting, and by suitably designing the means for guiding the movement of the magnet support and the spring bias, the movement of the magnet support may additionally be given a character to further adjust the braking torque.

What I claim and desire to secure by Letters Patent is:

1. A fishing reel comprising a frame, a line spool rotatably mounted in the frame, a magnetic brake including a plurality of permanent magnets, magnet supporting means to support said magnets, means to movably mount said magnet supporting means for movement in said frame, and a rotary surface including magnetically activable material and connected to be rotated by said line spool when said line spool is rotated, said magnets having pole ends facing said surface in such spaced relationship thereto that the magnetic field therebetween is capable of inducing eddy current therein when said line spool with said surface is rotated, thereby to effect a braking torque on the rotating line spool via said surface, the force of said braking torque being related to the strength of said magnetic field and to the distance between said pole ends and said surface, said supporting means being movable by said means to movably mount said magnetic supporting means for movement in relation to said surface between first and second end positions, said pole ends in said first and second end positions of said supporting means being positioned, respectively, at a predetermined minimum and a predetermined maximum distance from said surface, and said magnetic brake further comprising guide means for guiding said magnet supporting means between said end positions in combination with rotational movements, and spring biasing means connected to said magnet supporting means and tending to rotate and thereby to move said magnetic supporting means in one direction to one of said first and second positions, the counter-electromotive force induced in said surface when the latter, together with the line spool, is rotated tending to rotate and thereby to move said magnet supporting means in the opposite direction against the action of said biasing means, whereby the actual position of said magnet supporting means between said first and second end positions and, hence, the braking effect of said magnetic brake on said line spool are automatically adjusted in dependence upon the speed of rotation of the line spool, said magnet supporting means supporting said magnets in positions in which the axes of said magnets are parallel to the rotational axis of said line spool, and wherein said rotary surface is a substantially radial surface.

2. A fishing reel comprising a frame, a line spool rotatably mounted in the frame, a magnetic brake including a plurality of permanent magnets, magnet suporting means to support said magnets, means to movably mount said magnet supporting means for movement in said frame, and a rotary surface including magnetically activable material and connected to be rotated by said line spool when said line spool is rotated, said magnets having pole ends facing said surface in such spaced relationship thereto that the magnetic field therebetween is capable of inducing eddy current therein when said line spool with said surface is rotated, thereby to effect a braking torque on the rotating line spool via said surface, the force of said braking torque being related to the strength of said magnetic field and to the distance between said pole ends and said surface, said supporting means being movable by said means to movably mount said magnetic supporting means for movement in relation to said surface between first and second end positions, said pole ends in said first and second end positions of said supporting means being positioned, respectively, at a predetermined minimum and a predetermined maximum distance from said surface, and said magnetic brake further comprising guide means for guiding said magnet supporting means between said end positions in combination with rotational movements, and spring biasing means connected to said magnet supporting means and tending to rotate and thereby to move said magnetic supporting means in one direction to one of said first and second positions, the counter-electromotive force induced in said surface when the latter, together with the line spool, is rotated tending to rotate and thereby to move said magnet supporting means in the opposite direction against the action of said biasing means, whereby the actual position of said magnet supporting means between said first and second end positions and, hence, the braking effect of said magnetic brake on said line spool are automatically adjusted in dependence upon the speed of rotation of the line spool, said rotary surface being a substantially cylindrical surface supported by said line spool and coaxial therewith, said magnet supporting means being in the form of a unitary support supporting said magnets in positions with their axes extending substantially radially and with said pole ends at least partially surrounded by said cylindrical surface, and means to rotatably and eccentrically mount said support for rotary movement of said support in opposite directions by means of the force of reaction from said rotary surface of said support and the biasing force acting thereon from said biasing means to effect radial movement of said magnets in the direction of and away from, respectively, said rotary surface.

3. A fishing reel comprising a frame, a line spool rotatably mounted in the frame, a magnetic brake including a plurality of permanent magnets, magnet supporting means to support said magnets, means to movably mount said magnet supporting means for movement in said frame, and a rotary surface including magnetically activable material and connected to be rotated by said line spool when said line spool is rotated, said magnets having pole ends facing said surface in such spaced relationship thereto that the magnetic field therebetween is capable of inducing eddy current therein when said line spool with said surface is rotated, thereby to effect a braking torque on the rotating line spool via said surface, the force of said braking torque being related to the strength of said magnetic field and to the distance between said pole ends and said surface, said supporting means being movable by said means to movably mount said magnetic supporting means for movement in relation to said surface between first and second end positions, said pole ends in said first and second end positions of said supporting means being positioned, respectively, at a predetermined minimum and a predetermined maximum distance from said surface, and said magnetic brake further comprising guide means for guiding said magnet supporting means between said end positions in combination with rotational movement, and spring biasing means connected to said magnet supporting means and tending to rotate and thereby to move said magnetic supporting means in one direction to one of said first and second positions, the counter-electromotive force induced in said surface when the latter, together with the line spool, is rotated tending to rotate and thereby to move said magnet supporting means in the opposite direction against the action of said biasing means, whereby the actual position of said magnet supporting means between said first and second end positions and, hence, the braking effect of said magnetic brake on said line spool are automatically adjusted in dependence upon the speed of rotation of the line spool, said magnetic brake comprising an adjusting means for adjusting the bias of said spring biasing means, said adjusting means comprising operating means mounted to be accessible from the outer side of the fishing reel.

* * * * *